US010459456B2

(12) United States Patent
Flickinger et al.

(10) Patent No.: US 10,459,456 B2
(45) Date of Patent: Oct. 29, 2019

(54) AUTONOMOUS HELICOPTER POSTURE REGULATION TO MOVING REFERENCE FRAMES

(71) Applicant: Sikorsky Aircraft Corporation, Stratford, CT (US)

(72) Inventors: Daniel Montrallo Flickinger, Woodbridge, CT (US); Mark D. Ward, Milford, CT (US); William T. McNeill, New Haven, CT (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 147 days.

(21) Appl. No.: 15/693,635

(22) Filed: Sep. 1, 2017

(65) Prior Publication Data
US 2018/0059689 A1 Mar. 1, 2018

Related U.S. Application Data

(60) Provisional application No. 62/382,415, filed on Sep. 1, 2016.

(51) Int. Cl.
*G05D 1/00* (2006.01)
*B64D 1/00* (2006.01)
(Continued)

(52) U.S. Cl.
CPC .............. *G05D 1/12* (2013.01); *B64D 1/22* (2013.01); *G05D 1/0684* (2013.01); *G05D 1/0088* (2013.01)

(58) Field of Classification Search
CPC .......... G05D 1/00; G05D 1/12; G05D 1/0684; G05D 1/0088; B64D 1/22; B64C 39/00;
(Continued)

(56) References Cited

U.S. PATENT DOCUMENTS 6,653,970 B1 * 11/2003 Mitra .................... G01S 13/003
342/191
8,554,395 B2 10/2013 Andersson
(Continued)

FOREIGN PATENT DOCUMENTS

JP 2012201176 A 10/2012

OTHER PUBLICATIONS

Nonaka et al.; "Integral Sliding Mode Altitude Control for a Small Model Helicopter with Ground Effect Compensation", 2011 American Control Conference, San Franscisco, CA, USA; XP92034742; Jun. 29-Jul. 1, 2011; pp. 202-207.
(Continued)

*Primary Examiner* — Yonel Beaulieu
(74) *Attorney, Agent, or Firm* — Cantor Colburn LLP

(57) ABSTRACT

A system and method for flying an aircraft is disclosed. A perception system at the aircraft tracks a trajectory of a moving object. A processor determines, from the trajectory of the moving object, a reference frame in which the moving object is stationary and establishes the aircraft at a selected offset from the moving object for the trajectory of the moving object. The aircraft is flown along a flight path based on the selected offset using calculations performed with respect to the determined reference frame.

11 Claims, 2 Drawing Sheets

(51) Int. Cl.
 *G05D 1/12* (2006.01)
 *B64D 1/22* (2006.01)
 *G05D 1/06* (2006.01)

(58) Field of Classification Search
 CPC ... B64C 27/00; B64C 29/00; B64C 2027/005; B64C 2201/00
 See application file for complete search history.

(56) References Cited

U.S. PATENT DOCUMENTS

| | | | |
|---|---|---|---|
| 8,949,011 B2 | 2/2015 | Ford et al. | |
| 9,056,676 B1 * | 6/2015 | Wang | B64F 1/00 |
| 9,146,557 B1 * | 9/2015 | Ahmed | G05D 1/0858 |
| 9,214,089 B2 | 12/2015 | Brunetti et al. | |
| 9,315,268 B2 * | 4/2016 | Sane | B64D 1/12 |
| 9,422,139 B1 * | 8/2016 | Bialkowski | B64C 39/024 |
| 9,583,012 B1 * | 2/2017 | Loftis | G08G 5/04 |
| 9,828,107 B1 * | 11/2017 | Ruymgaart | B64D 31/06 |
| 2011/0118901 A1 | 5/2011 | Geoffroy et al. | |
| 2011/0270474 A1 | 11/2011 | Builta et al. | |
| 2015/0142211 A1 * | 5/2015 | Shehata | H04N 7/181 |
| | | | 701/2 |
| 2015/0353206 A1 * | 12/2015 | Wang | B64F 1/00 |
| | | | 244/114 R |
| 2016/0023762 A1 * | 1/2016 | Wang | B64F 1/00 |
| | | | 701/3 |
| 2016/0332748 A1 * | 11/2016 | Wang | B64F 1/00 |
| 2018/0075632 A1 * | 3/2018 | Baron | B64D 43/00 |
| 2018/0229855 A1 * | 8/2018 | Sane | G05B 17/02 |

OTHER PUBLICATIONS

The extended European search report; Application No. 17188547.8; dated Jan. 18, 2018; pp. 1-8.

* cited by examiner

AUTONOMOUS HELICOPTER POSTURE REGULATION TO MOVING REFERENCE FRAMES

CROSS REFERENCE TO RELATED APPLICATIONS

The present application claims priority from U.S. Provisional Application Ser. No. 62/382,415, filed on Sep. 1, 2016, the contents of which are incorporated herein by reference in their entirety.

BACKGROUND OF THE INVENTION

The present invention is directed to a system and method for flying an aircraft with respect to a moving object and, in particular, to flying a rotary-wing aircraft with respect to a marine vessel on a body of water.

The operation of a rotary-wing aircraft frequently involves close interactions between the aircraft and a moving vehicle that is in the water, on the ground, or in the air. For such interactions, pilots frequently need to track the moving vehicle and reposition the aircraft with respect to the moving vehicle, requiring significant pilot workload and skill. Additionally, when the aircraft is carrying an auxiliary load, such as a slung load, the pilot is often required to maintain the slung load stationary with respect to moving object. Further complications arise in these interactions when the vehicle is a marine vessel, because waves and other forms of turbulence can cause unexpected motions and rotations of the marine vessel.

SUMMARY OF THE INVENTION

According to one embodiment of the present invention, a method of flying an aircraft is disclosed, the method including: determining a trajectory of a moving object relative to the aircraft; determine, from the trajectory of the moving object, a reference frame in which the moving object is stationary; flying the aircraft via a processor to maintain the aircraft at a selected offset from the moving object for the determined trajectory of the moving object; and implementing a flight command to fly the aircraft along a flight path using calculations performed with respect to the determined reference frame.

According to another embodiment of the present invention, an autonomous flight control system for an aircraft is disclosed, the system including: a perception system at the aircraft for tracking a trajectory of a moving object; and a processor configured to: determine, from the trajectory of the moving object, a reference frame in which the moving object is stationary; establish the aircraft at a selected offset from the moving object for the trajectory of the moving object, and fly the aircraft along a flight path based on the selected offset using calculations performed with respect to the determined reference frame.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

In accordance with an embodiment of the present invention, a vehicle autonomy management system runs as part of an autonomous system for flying an aircraft.

Figure 1:
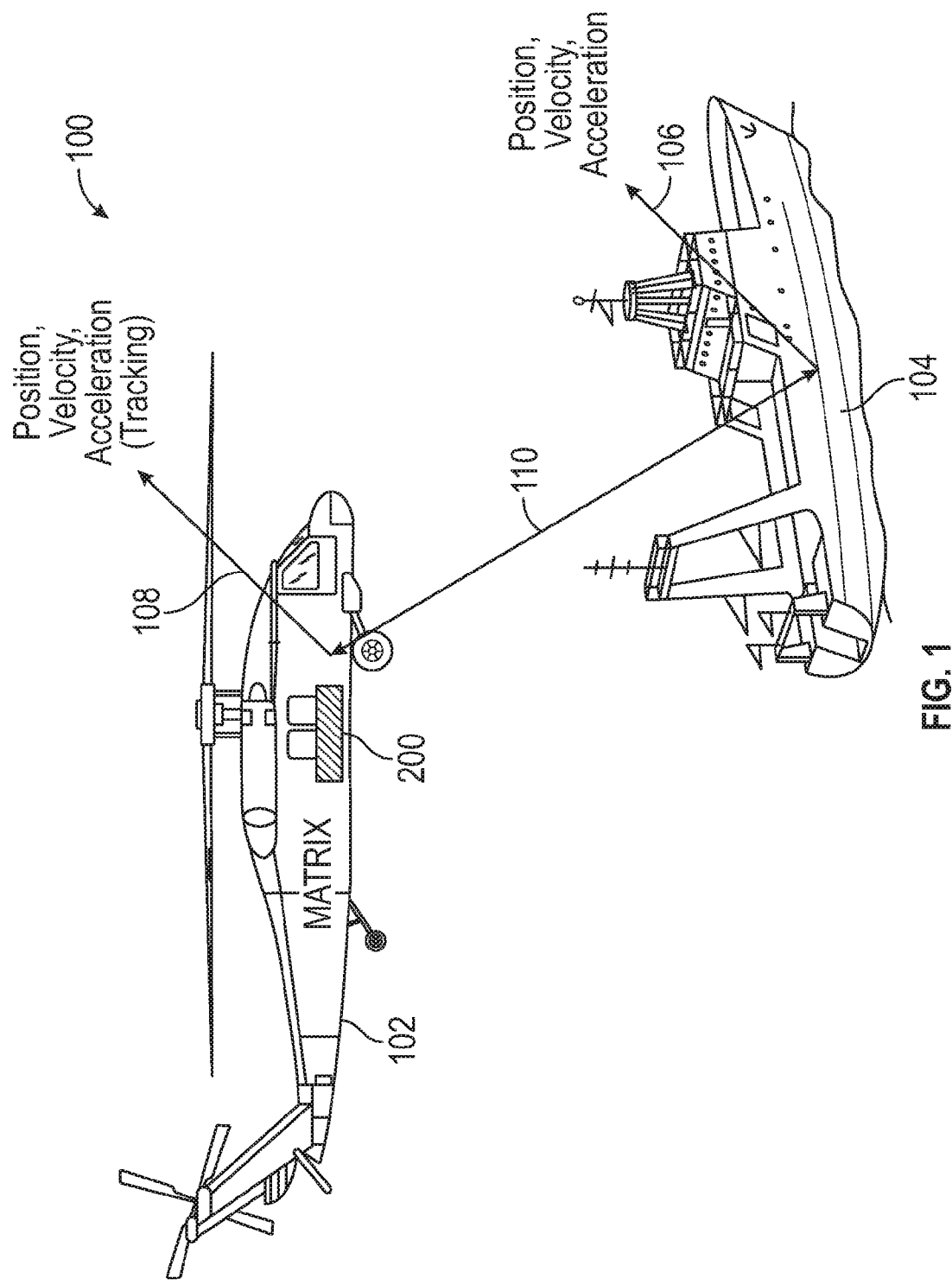
FIG. 1 schematically illustrates a flight scenario of an aircraft with respect to a moving object.

Referring now to the Figures, where the invention will be described with reference to specific embodiments, without limiting same, FIG. 1 schematically illustrates a flight scenario 100 of an aircraft 102 with respect to a moving object. In various embodiments, the moving object is a marine vessel 104. In one embodiment, the marine vessel 104 is an able vessel in motion along the water and the aircraft 102 is a rotary-wing aircraft that interacts with the marine vessel 104 by, for example, landing on the marine vessel 104 or depositing an item or load that is being conveyed by the rotary-wing aircraft onto the marine vessel 104. In another embodiment, the marine vessel 104 is a stranded vessel or vessel in emergency to which the aircraft 102 lowers an item, such as a rescue basket. While the moving object is described herein as a marine vessel 104 for illustrative purposes, although this is not meant as a limitation on the invention. In other embodiments, the moving object can be an object moving on land or an object moving in the air.

In general, the marine vessel 104 moves according to a vessel trajectory 106, which can be characterized by at least a vessel position vector, a vessel velocity vector and a vessel acceleration vector. The vessel position vector can include both position coordinates and orientation coordinates, and the vessel velocity vector can include translational velocities as well as rotation velocities indicating changes in the orientation coordinates. Some of these trajectory vectors, including the velocity and the orientation of the marine vessel 104 for example, may be long-term vectors which are relatively constant or stable during a time-frame over which the aircraft 102 and marine vessel 104 interact. Other trajectory vectors, such as a pitch or roll of the vessel, may be short-term vectors which vary significantly over this interaction time-frame. In order to track the marine vessel 104 from a distance, a pilot may rely more on these long-term trajectory vectors, while being able to ignore short-term vectors. However, as the aircraft 102 approaches the marine vessel 104 and interacts with the marine vessel 104, the pilot increasing takes into account these short-term vectors.

The aircraft 102 similarly moves according to an aircraft trajectory 108, which is characterized by at least an aircraft position vector, an aircraft velocity vector and an aircraft acceleration vector. The aircraft trajectory 108 can be obtained using sensors and/or instruments on-board the aircraft 102.

In one aspect of the invention, the aircraft 102 includes an autonomous flight control system 200 that tracks the vessel trajectory 106 and the aircraft trajectory 108 and establishes the aircraft 102 at an offset vector 110 relative to the marine vessel 104 based on the vessel trajectory 106 and the aircraft trajectory 108. In one embodiment, the autonomous flight control system 200 flies the aircraft to maintain a stationary position (i.e., the offset vector 110) within respect to the marine vessel 104. Once the aircraft 102 has established itself at the stationary position within the frame of the marine vessel 104, the autonomous flight control system 200 can implement a flight plan with respect to the marine vessel 104 based on the offset vector 110. An exemplary function includes landing on the marine vessel 104, such as on a platform of the marine vessel 104. Another possible function includes depositing a slung load on the marine vessel 104 or the platform of the marine vessel 104. In an alternate embodiment, the autonomous flight control system 200 can maintain an overall stationary position of the aircraft 102 with respect to the marine vessel 104 while allowing the pilot to make minor adjustments, generally to account for short-term movements of the marine vessel 104 during landing or other close interactions. In other embodiments, a plurality of aircrafts may fly in formation with respect to the marine vessel 104 or another moving object. Additionally, the aircraft 102 may perform in-flight fueling with respect to the marine vessel 104 or another moving object.

Figure 2:
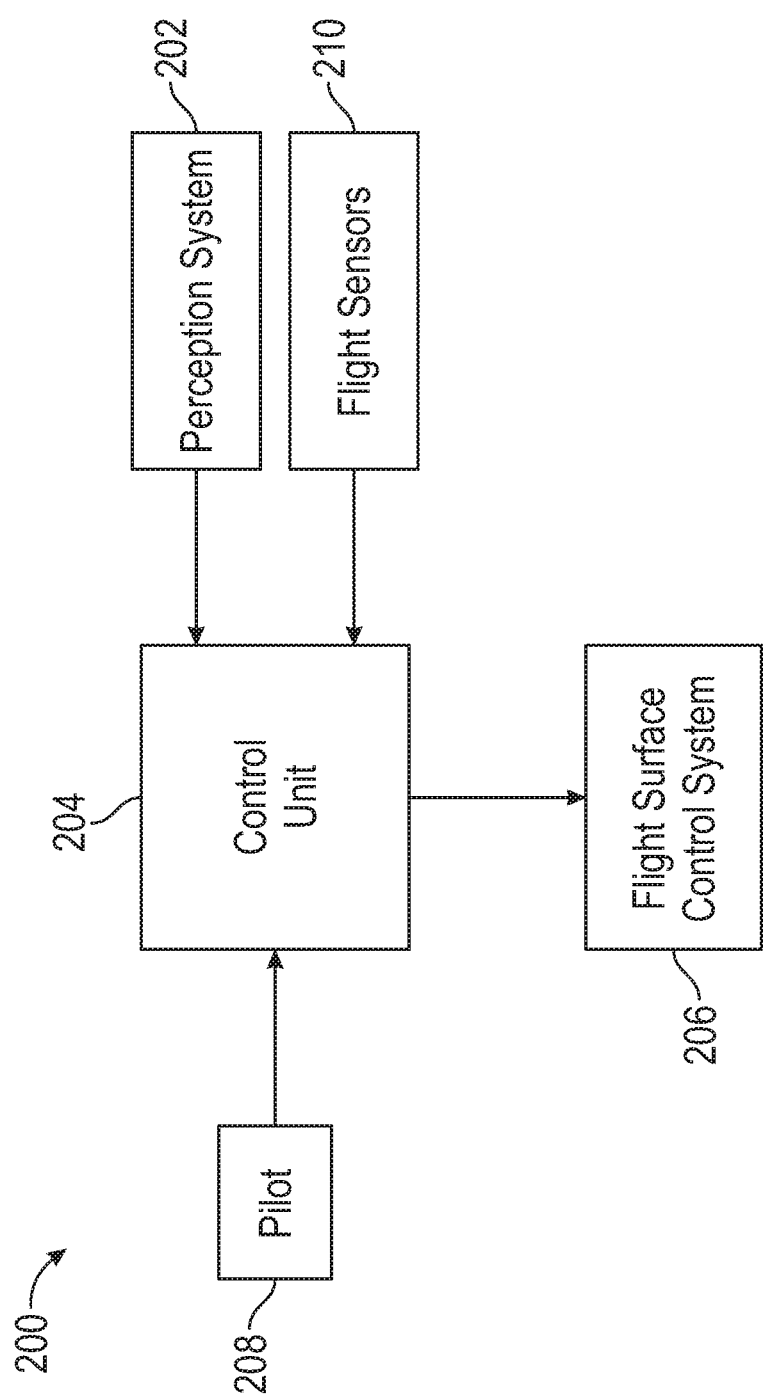
FIG. 2 shows a schematic diagram of the autonomous flight control system according to one embodiment of the invention.

FIG. 2 shows a schematic diagram of the autonomous flight control system 200 according to one embodiment of the invention. The autonomous flight control system 200 includes a perception system 202 that obtains data related to the trajectory or motion of the marine vessel 104, flight sensors 210 that provides data related to the aircraft trajectory 108, a control unit 204 that determines the vessel trajectory vector 106 from the data obtained at the perception system 202 and the aircraft trajectory vector 108 from the data from the flight sensors 210 and determines a flight plan according to the trajectories, and a flight surface control system 206 that flies the aircraft 102 according to a flight command provided from one of the control unit 204 and a pilot 208.

The pilot 208 provides a signal to the control unit 204 in order to activate the autonomous flight control system 200. The control unit 204 can then activate a closed loop control over the aircraft 102 in one embodiment. In general, the pilot 208 provides a command to the control unit 204 to request the control unit 204 to perform a selected function. For example, the pilot 208 can provide a command to the control unit 204 to land the aircraft 102 at the marine vessel 104. Once the command is received at the control unit 204, the control unit 204 performs calculations and implements flight commands at the aircraft 102 in order to successfully complete the command from the pilot 208.

In various embodiments, the perception system 202 includes a LIDAR (Light Detection and Ranging) system that provides a point cloud of data to a flight system. However, any form of perception system 202, including cameras, radar, infrared detectors, etc., may be used in alternate embodiments of the invention. The control unit 204 receives the data from the perception system 202 and performs calculations to determine the vessel trajectory 106 of the marine vessel 104, including its component vectors, such as velocity vectors. Flight sensors 210 provide the aircraft trajectory 108 to the control unit 204. The control unit 204 uses the vessel trajectory 106 and the aircraft trajectory 108 to determine a flight plan to perform the commanded function. The control unit 204 provides flight command signals to the flight surface control system 206, which flies the aircraft 102 according to the flight command signals. Flight sensors 210 provide feedback to the control unit 204 concerning the aircraft trajectory 108. This feedback can be used by the control 204 in subsequent calculations in order to determine how well the flight plan is being executed and to issue a flight command to provide a corrective action, if necessary.

To maintain a stationary position with respect to the marine vessel 104, the autonomous flight control system 202 may mainly track the long-term trajectory vectors of the marine vessel 104 and establish its position with respect to the marine vessel 104 using these long-term trajectory vectors. As the aircraft 102 approaches the marine vessel 104, especially for the purpose of landing on the marine vessel 104 or landing a load on the marine vessel 104, the autonomous flight control system 202 may increasingly involve the various short-term trajectory vectors of the marine vessel 104 into its calculations. In one embodiment, the autonomous flight control system 202 can move the aircraft 102 according to a landing pattern that coordinates movement of the aircraft 102 with these short-term trajectory vectors. For example, the aircraft 102 can mimic the short-term trajectory vectors or can move a slung load so that the slung load mimics the short-term trajectory vectors. For a vessel that is rolling from side to side, the aircraft 102 may employ a flight pattern that rolls the aircraft from side to side along with the vessel. Rolling the aircraft 102 synchronously with the marine vessel 104 maintains an alignment between aircraft landing gear and a platform of the marine vessel 104, thereby increasing a reliability of the landing. Additionally, when providing a slung load to a selected location of the marine vessel 104, the control unit 204 can maneuver the aircraft 102 so that the slung load moves synchronously with the marine vessel 104.

In another embodiment, the autonomous flight control system 202 maintains the offset vector 110 of the aircraft 102 while the pilot 208 provides adjustments to the flight of the aircraft 102 to account for short-term motions of the marine vessel 104. In this capacity, the autonomous flight control system 200 reduces a pilot workload. The pilot may, once the offset vector has been established, perform a flight maneuver in relation to the marine vessel 104, i.e., flying to control the offset vector 110.

In another embodiment, the autonomous flight control system 202 can execute a flight plan that takes into account a near-field effect that the aircraft 102 has on the marine vessel 104. For example, the control unit 204 can calculate the effect that rotor wash or a downward force on the vessel trajectory 106 that is provided by the rotor blades of the aircraft 102. Rotor wash can cause the marine vessel 104 to move with respect to the aircraft 102. Therefore, the control unit 204 calculates the effect of rotor wash on the marine vessel 104 and adjusts the flight path of the aircraft 102 to correct for this movement in order to provide a more reliable landing of the aircraft 102 at the marine vessel 104.

In an alternate scenario, the pilot may intend to move or re-orient the marine vessel 204 using the rotor wash. Therefore, the control unit 204 can employ can calculate a force as well as an application location of the force at the marine vessel 204 that moves or re-orients the marine vessel 204 according to the pilot's intentions. The autonomous flight control system 202 can then apply the calculated force to the marine vessel 104.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only

Having thus described the invention, it is claimed:

1. A method of flying an aircraft, comprising:
   determining a trajectory of a moving object relative to the aircraft;
   determine, from the trajectory of the moving object, a reference frame of the moving object;
   flying the aircraft via a processor to maintain the aircraft at a selected offset from the moving object for the determined trajectory of the moving object;
   implementing a flight command to fly the aircraft along a flight path using calculations performed with respect to the determined reference frame;
   tracking a rotation of the moving object about an axis of the moving object; and
   performing one of mimicking the rotation of the moving object at the aircraft and mimicking the rotation of the moving object at a slung load conveyed by the aircraft.

2. The method of claim 1, wherein flying the aircraft along the flight path further comprises one of landing the aircraft on the moving object and landing an item conveyed by the aircraft on the moving object.

3. The method of claim 1, further comprising calculating a near-field effect of the aircraft on a trajectory of the moving object and correcting the flight path of the aircraft for the near-field effect.

4. The method of claim 1, further comprising calculating a near-field effect of the aircraft on a trajectory of the moving object and altering the trajectory of the moving object via the near-field effect.

5. The method of claim 1, wherein the processor determines the reference frame of the moving object and maintains the selected offset between the aircraft and the moving object for the determined reference frame and wherein a pilot performs a flight maneuver based on the selected offset.

6. The method of claim 1, wherein the flight maneuver includes changing the offset between the aircraft and the moving object.

7. An autonomous flight control system for an aircraft, comprising:
   a perception system at the aircraft for tracking a trajectory of a moving object; and
   a processor configured to:
      determine, from the trajectory of the moving object, a reference frame in which the moving object is stationary;
      establish the aircraft at a selected offset from the moving object for the trajectory of the moving object;
      fly the aircraft along a flight path based on the selected offset using calculations performed with respect to the determined reference frame;
      track a rotation of the moving object about an axis; and
      perform one of mimicking the rotation of the moving object at the aircraft and mimicking the rotation of the moving object at a slung load conveyed by the aircraft.

8. The autonomous flight control system of claim 7, wherein the processor is further configured to perform one of landing the aircraft on the moving object and landing an item conveyed by the aircraft on the moving object.

9. The autonomous flight system of claim 7, wherein the processor is further configured to calculate a near-field effect of the aircraft on the trajectory of the moving object and correct the flight path of the aircraft for the near-field effect.

10. The autonomous flight system of claim 7, wherein the processor is further configured to calculate a near-field effect of the aircraft on a trajectory of the moving object and alter the trajectory of the moving object via the near-field effect.

11. The autonomous flight system of claim 7, wherein a pilot flies the aircraft to the selected offset between the aircraft and the moving object and the processor is further configured to maintain the selected offset and while the pilot performs a flight maneuver at the aircraft based on the selected offset.

* * * * *